(12) United States Patent
Miura et al.

(10) Patent No.: US 10,502,638 B2
(45) Date of Patent: Dec. 10, 2019

(54) TEMPERATURE DETECTING DEVICE AND ELECTRONIC DEVICE

(71) Applicant: Murata Manufacturing Co., Ltd., Nagaokakyo-shi, Kyoto-fu (JP)

(72) Inventors: Tadamasa Miura, Nagaokakyo (JP); Kazuto Miyagawa, Nagaokakyo (JP); Akihito Naito, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 443 days.

(21) Appl. No.: 15/409,691

(22) Filed: Jan. 19, 2017

(65) Prior Publication Data

US 2017/0131156 A1    May 11, 2017

Related U.S. Application Data

(63) Continuation of application No. PCT/JP2015/066505, filed on Jun. 8, 2015.

(30) Foreign Application Priority Data

Jul. 31, 2014 (JP) ................................ 2014-155959

(51) Int. Cl.
*G01K 7/22* (2006.01)
*G01K 7/16* (2006.01)
*G01K 13/00* (2006.01)

(52) U.S. Cl.
CPC ................. *G01K 7/22* (2013.01); *G01K 7/16* (2013.01); *G01K 13/00* (2013.01)

(58) Field of Classification Search
CPC ........... G01K 1/14; G01K 13/00; G01K 1/16; G01K 7/00; G01K 7/16

(Continued)

(56) References Cited

U.S. PATENT DOCUMENTS 8,730,646 B2 * 5/2014 Kawasaki ............... H01G 4/005
361/305
2003/0185278 A1 * 10/2003 Roepke ............... H01M 10/486
374/152

(Continued)

FOREIGN PATENT DOCUMENTS

JP    04-115131 A    4/1992
JP    08-068699 A    3/1996

(Continued)

OTHER PUBLICATIONS

Official Communication issued in corresponding International Application PCT/JP2015/066505, dated Jun. 30, 2015.

*Primary Examiner* — Gail Kaplan Verbitsky
(74) *Attorney, Agent, or Firm* — Keating & Bennett, LLP

(57) ABSTRACT

A temperature detector is configured to detect the temperature of a housing while in contact with the housing, and a spring pin is in contact with the temperature detector in a separable manner. Thus, at mounting of the temperature detecting device on an electronic device, it is possible to fix the temperature detector to the housing, and the spring pin to a circuit board of the electronic device. At disassembly of the electronic device, it is easy to separate the spring pin from the temperature detector by removing, from the housing, the spring pin together with the circuit board. At assembly of the electronic device, it is easy for the spring pin to contact the temperature detector by attaching, to the housing, the spring pin together with the circuit board.

20 Claims, 3 Drawing Sheets

(58) Field of Classification Search
USPC .................. 374/208, 163, 185, 183, 100
See application file for complete search history.

(56) References Cited

U.S. PATENT DOCUMENTS

| | | | |
|---|---|---|---|
| 2008/0116922 A1* | 5/2008 | Blaney | G01R 31/2891 324/750.03 |
| 2008/0116924 A1* | 5/2008 | Blaney | G01R 1/06722 324/754.07 |
| 2008/0180210 A1* | 7/2008 | Ikeda | H01C 1/016 338/22 R |
| 2009/0305397 A1* | 12/2009 | Dodgson | B01L 3/5085 435/305.3 |
| 2010/0040112 A1* | 2/2010 | Huck | G01K 1/08 374/183 |
| 2011/0316754 A1 | 12/2011 | Nam et al. | |
| 2012/0032858 A1 | 2/2012 | Chang et al. | |
| 2012/0039050 A1 | 2/2012 | Chang et al. | |
| 2015/0071327 A1* | 3/2015 | Krampert | G01K 1/143 374/208 |
| 2015/0325369 A1* | 11/2015 | Inoue | H01C 17/02 336/200 |
| 2016/0324031 A1* | 11/2016 | Fujiwara | H01L 23/367 |
| 2019/0041112 A1* | 2/2019 | Chatelle | F25C 1/25 |

FOREIGN PATENT DOCUMENTS

| | | |
|---|---|---|
| JP | 08-219903 A | 8/1996 |
| JP | 2011-239524 A | 11/2011 |
| JP | 2012-010317 A | 1/2012 |
| JP | 2012-039596 A | 2/2012 |
| JP | 2012-044640 A | 3/2012 |

* cited by examiner

TEMPERATURE DETECTING DEVICE AND ELECTRONIC DEVICE

CROSS REFERENCE TO RELATED APPLICATIONS

This application claims the benefit of priority to Japanese Patent Application No. 2014-155959 filed on Jul. 31, 2014 and is a Continuation Application of PCT Application No. PCT/JP2015/066505 filed on Jun. 8, 2015. The entire contents of each application are hereby incorporated herein by reference.

BACKGROUND OF THE INVENTION

1. Field of the Invention

The present invention relates to a temperature detecting device and an electronic device.

2. Description of the Related Art

The conventional temperature detecting device is disclosed in, for example, Japanese Patent Laid-Open No. 8-68699. The temperature detecting device includes a substrate including a wire, and a thermistor attached to the substrate and electrically connected with the wire. The substrate is formed in a band shape having a first edge and a second edge in the longitudinal direction thereof. A thermistor is fixed to the first edge of the substrate.

The temperature detecting device is used to detect the temperature of a housing of an electronic device. In this case, the thermistor fixed to the first edge of the substrate is disposed at a predetermined position of the housing. The second edge of the substrate is electrically connected with a circuit board of the electronic device.

When the conventional temperature detecting device is mounted on an electronic device, the first edge of the substrate is not fixed to the housing, whereas the second edge of the substrate is fixed to the circuit board of the electronic device. Since the second edge of the substrate is fixed to the circuit board of the electronic device, the temperature detecting device is removed from the housing together with the circuit board when the electronic device is disassembled for component replacement, repair, or the like. Thereafter, when the electronic device is assembled again, the temperature detecting device is attached in the housing together with the circuit board. Since the first edge of the substrate is not fixed to the housing, extra work is needed to put the thermistor fixed to the second edge of the substrate back to the predetermined position of the housing.

SUMMARY OF THE INVENTION

Accordingly, preferred embodiments of the present invention provide temperature detecting devices that achieve favorable convenience in assembling when used in an electronic device, and an electronic devices including such temperature detecting devices.

A temperature detecting device according to a preferred embodiment of the present invention is configured to detect the temperature of a housing and includes a temperature detector configured to detect the temperature of the housing while in contact with the housing, and a spring pin electrically connected with the temperature detector while in contact with the temperature detector in a separable manner. The temperature detector includes a substrate including wire, and a thermistor attached to the substrate and electrically connected with the wire. The spring pin includes a tube body, a pin portion attached in the tube body in a movable manner, and a spring configured to press the pin portion to protrude out of the tube body. The pin portion is electrically connected with the wire of the substrate while in contact with the wire of the substrate in a separable manner.

In a temperature detecting device according to a preferred embodiment of the present invention, the temperature detector is configured to detect the temperature of the housing while in contact with the housing, and the spring pin is in contact with the temperature detector in a separable manner. With this configuration, at mounting of the temperature detecting device on an electronic device, it is possible to fix the temperature detector to the housing, and the spring pin to a circuit board of the electronic device.

At disassembly of the electronic device for component replacement, repair, or the like, it is easy to separate the spring pin from the temperature detector by removing, from the housing, the spring pin together with the circuit board because the spring pin is in contact with the temperature detector in a separable manner. Then, at assembly of the electronic device again, it is easy to make the spring pin contact with the temperature detector by attaching, to the housing, the spring pin together with the circuit board. Since the temperature detector is fixed to the housing, the position of the thermistor is able to be maintained with respect to the housing during the assembly, which eliminates the need to adjust the position of the thermistor. Accordingly, favorable convenience is able to be achieved in assembling when the temperature detecting device is used in the electronic device.

An electronic device according to a preferred embodiment includes a housing, a circuit board disposed in the housing, and the temperature detecting device disposed in the housing and configured to detect the temperature of the housing.

An electronic device according to a preferred embodiment includes a temperature detecting device according to other preferred embodiments of the present invention, and thus provides favorable convenience in assembling.

In an electronic device according to a preferred embodiment of the present invention, the temperature detector of the temperature detecting device is fixed to the housing, and the spring pin of the temperature detecting device is fixed to the circuit board.

In an electronic device according to a preferred embodiment of the present invention, the temperature detector of the temperature detecting device is fixed to the housing, and the spring pin of the temperature detecting device is fixed to the circuit board. With this configuration, at disassembly of the electronic device for component replacement, repair, or the like, it is easy to separate the spring pin from the temperature detector by removing, from the housing, the spring pin together with the circuit board because the spring pin is in contact with the temperature detector in a separable manner. Then, at assembly of the electronic device again, it is easy for the spring pin to contact the temperature detector by attaching, to the housing, the spring pin together with the circuit board. Since the temperature detector is fixed to the housing, the position of the thermistor is able to be maintained with respect to the housing during the assembly, which eliminates the need to adjust the position of the thermistor. Accordingly, the electronic device provides favorable convenience in assembling.

In a temperature detecting device according to a preferred embodiment of the present invention, a temperature detector is configured to detect the temperature of a housing while in contact with the housing, and a spring pin is electrically connected with the temperature detector while in contact with the temperature detector in a separable manner. Accordingly, favorable convenience is achieved in assembling when the temperature detecting device is used in an electronic device.

An electronic device according to a preferred embodiment of the present invention includes the temperature detecting device, and thus provides favorable convenience in assembling.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below in detail with reference to the accompanying drawings.

Figure 1:
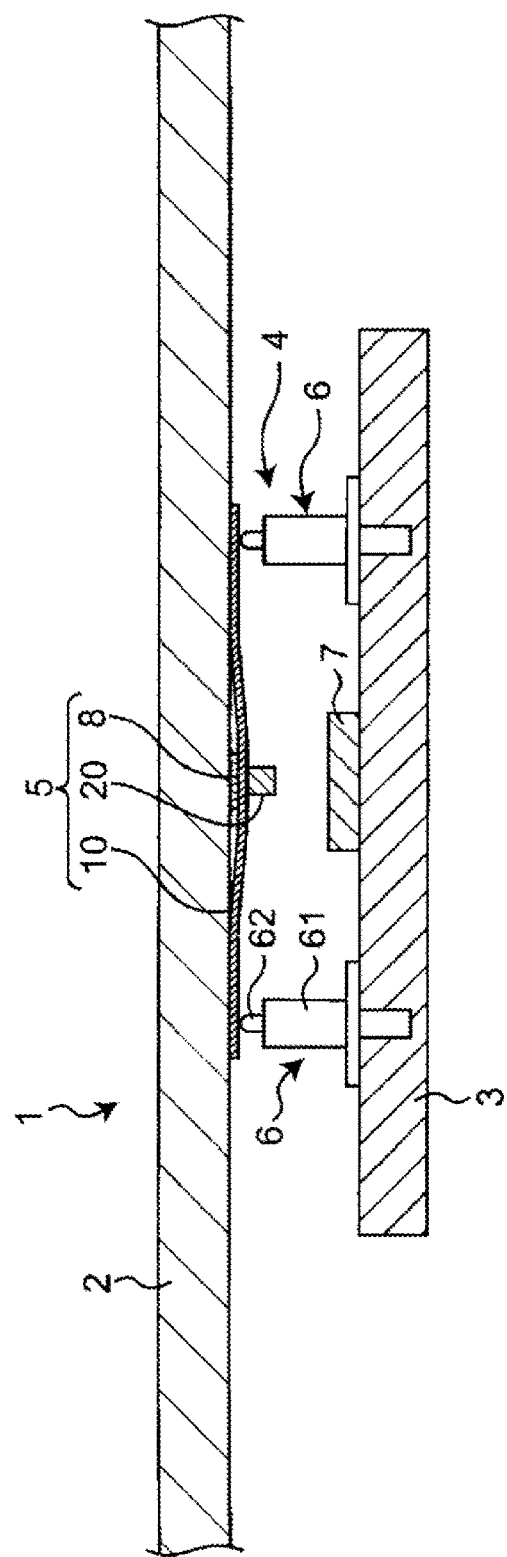
FIG. 1 is a simplified sectional view illustrating a temperature detecting device and an electronic device according to a preferred embodiment of the present invention.

FIG. 1 is a simplified sectional view illustrating a temperature detecting device and an electronic device according to a preferred embodiment of the present invention. As illustrated in FIG. 1, this electronic device 1 includes a housing 2, and a circuit board 3 and a temperature detecting device 4 that are disposed in the housing 2. The electronic device 1 preferably is a mobile device such as a smartphone, a tablet, or a notebook PC.

The housing 2 preferably is a case with, for example, a rectangular parallelepiped or substantially rectangular parallelepiped shape. The case includes a case body provided with an opening, and a lid that covers the opening of the case body. For example, a liquid crystal display is attached to the housing 2.

An electric component (hereinafter referred to as a heat generating component 7), such as a CPU or a power amplifier, that generates a large amount of heat is mounted on the circuit board 3. The housing 2 is heated by the heat generated by the heat generating component 7.

The temperature detecting device 4 detects the temperature of the housing 2, a controller of the electronic device 1 prevents, for example, a user from touching the housing 2 at high temperature based on a result of the detection by the temperature detecting device 4. The temperature detecting device 4 includes a temperature detector 5 and two spring pins 6. The temperature detector 5 includes a substrate 10, and a thermistor 20 attached to the substrate 10. The spring pins 6 elastically press the temperature detector 5, making the temperature detector contact with the housing 2 elastically, which allows the thermistor 20 to detect the temperature of the housing 2.

Figure 2:
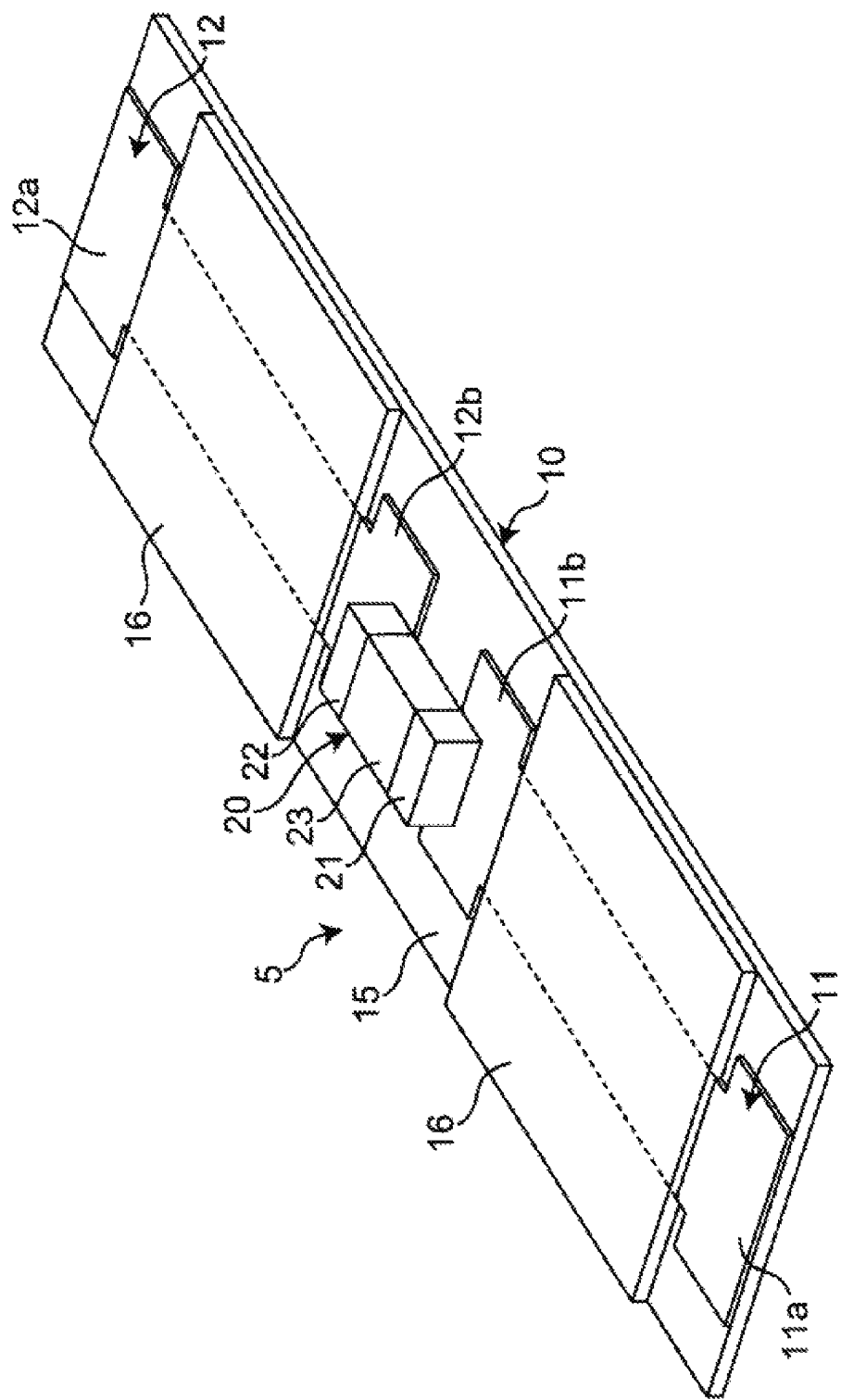
FIG. 2 is a perspective view of a temperature detector.

FIG. 2 is a perspective view of the temperature detector 5. As illustrated in FIG. 2, the substrate 10 is a flexible printed board. The substrate 10 includes a base material 15, a first wire 11 and a second wire 12 disposed on the base material 15, and two covers 16 that cover a portion of the first wire 11 and the second wire 12.

The base material 15 preferably has a band shape. The base material 15 is flexible and electrically insulating. The base material 15 is made of, for example, polyimide or polyethylene terephthalate.

The first wire 11 and the second wire 12 extend in the longitudinal direction of the base material 15. The first wire 11 and the second wire 12 is arranged in series in the longitudinal direction of the base material 15. The first wire 11 and the second wire 12 are made of conductive material. The conductive material is, for example, metal such as copper or an alloy of copper and nickel.

The first wire 11 includes a first terminal 11a and a second terminal 11b at both ends in the longitudinal direction. The second wire 12 includes a first terminal 12a and a second terminal 12b at both ends in the longitudinal direction. The first terminal 11a of the first wire 11 is positioned at one end side of the base material 15 in the longitudinal direction. The first terminal 12a of the second wire 12 is positioned on the other end side of the base material 15 in the longitudinal direction. The second terminal 11b of the first wire 11 and the second terminal 12b of the second wire 12 are disposed opposite to each other in a central portion of the substrate 10 in the longitudinal direction.

One of the covers 16 covers the other portion of the first wire 11 than the first and second terminals 11a and 11b. The other of the covers 16 covers the other portion of the second wire 12 than the first and second terminals 12a and 12b. With this configuration, the first and second terminals 11a and 11b of the first wire 11, and the first and second terminals 12a and 12b of the second wire 12 are exposed from the covers 16, respectively. The covers 16 are preferably made of electrically insulating resin films, for example.

The thermistor 20 is, for example, a multilayer chip thermistor, and includes a thermistor body 23, a first external electrode 21, and a second external electrode 22.

The thermistor body 23 includes a plurality of ceramic layers. The plurality of ceramic layers are laminated on top of another. An internal electrode is provided between adjacent ceramic layers. The thermistor body 23 has a temperature characteristic such that the resistance value thereof largely changes in response to a change in the ambient temperature. The thermistor body 23 is, for example, a NTC thermistor the resistance value of which decreases as the temperature increases. Such a NTC thermistor is able to be manufactured from an oxide sintered object (ceramic sintered object) obtained by mixing and sintering oxides of two to four selected from a group consisting of transition elements such as manganese, nickel, iron, cobalt, and copper. The thermistor body 23 may include no internal electrode.

The thermistor body 23 preferably has a rectangular parallelepiped or substantially rectangular parallelepiped shape. The thermistor body 23 includes first and second end surfaces facing to each other, and four side surfaces disposed between the first end surface and the second end surface.

The first and second external electrodes 21 and 22 each include, for example, an underlayer made of silver as a primary component, a nickel-plated layer provided on the underlayer, and a tin-plated layer provided on the nickel-plated layer.

The first external electrode 21 covers the first end surface of the thermistor body 23. Specifically, the first external electrode 21 covers the first end surface side of the four side surfaces of the thermistor body 23 as well as the entire region of the first end surface of the thermistor body 23.

The second external electrode 22 covers the second end surface of the thermistor body 23. Specifically, the second external electrode 22 covers the second end surface side of the four side surfaces of the thermistor body 23 as well as the entire region of the second end surface of the thermistor body 23.

The thermistor 20 is electrically connected with the first and second wires 11 and 12 of the substrate 10. Specifically, the first external electrode 21 of the thermistor 20 is joined with the second terminal 11b of the first wire 11 with solder interposed therebetween. The second external electrode 22 of the thermistor 20 is joined with the second terminal 12b of the second wire 12 with solder interposed therebetween. The thermistor 20 is attached to a central portion of the substrate 10 in the longitudinal direction.

Figure 3:
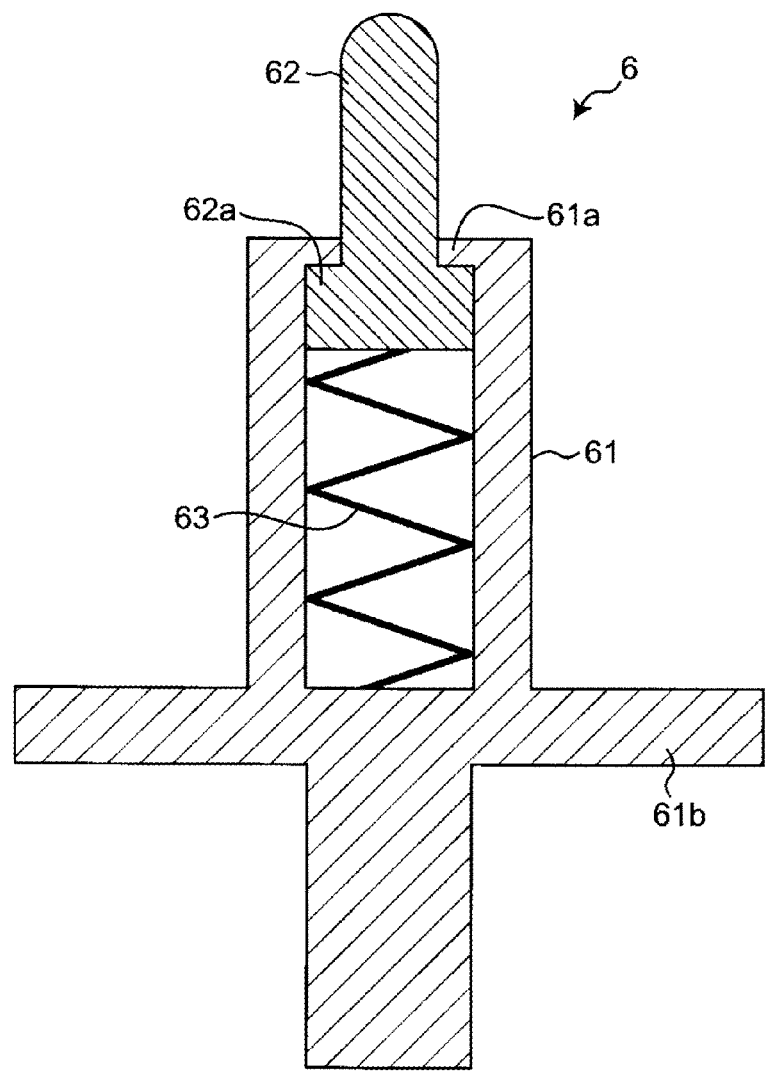
FIG. 3 is a sectional view of a spring pin.

FIG. 3 is a sectional view of each of the spring pins 6. As illustrated in FIGS. 1 and 3, the spring pin 6 is conductive. The spring pin 6 is made of, for example, metal such as copper, or an alloy of copper and nickel.

The spring pin 6 is what is called a pogo pin. The spring pin 6 includes a tube body 61, a pin portion 62 attached in the tube body 61 in a movable manner, and a spring 63 configured to press the pin portion 62.

An inward flange portion 61a is provided at an opening at one end of the tube body 61. An outward flange portion 62a is provided at an end portion of the pin portion 62. The outward flange portion 62a of the pin portion 62 is locked by the inward flange portion 61a of the tube body 61 to prevent the pin portion 62 from falling out of the tube body 61. An outward flange portion 61b is provided between the one end and the other end of the tube body 61.

The spring 63 is, for example, a compression coil spring, and presses the pin portion 62 to protrude out of the tube body 61. The pin portion 62 is able to be inserted into the tube body 61 against an elastic force by the spring 63.

As illustrated in FIGS. 1 to 3, the temperature detector 5 is fixed to the housing 2. Specifically, a surface of the base material 15, which is opposite to the thermistor 20, is fixed to the housing 2 with a bonding member 8 interposed therebetween. The bonding member 8 is, for example, a double-sided adhesive tape, and is thermally conductive. The bonding member 8 is disposed such that the bonding member 8 overlaps with the thermistor 20 when viewed in a direction orthogonal to the base material 15. The thermistor 20 detects heat of the housing 2 through the bonding member 8 and the substrate 10. The thermistor 20 is positioned directly above the heat generating component 7 with a gap therebetween. Due to this gap between the thermistor 20 and the heat generating component 7, the thermistor 20 is thermally insulated by air from the heat generating component 7.

Each of the spring pins 6 is fixed to the circuit board 3. Specifically, the other end of the tube body 61 is fixedly inserted into the circuit board 3. The spring pin 6 is joined with wire of the circuit board 3 with solder interposed therebetween. The two spring pins 6 are disposed to have the heat generating component 7 interposed therebetween.

The two spring pins 6 are electrically connected with the wires 11 and 12 of the substrate 10 while in contact with the wires 11 and 12 of the substrate 10 in a separable manner. The two spring pins 6 support both ends of the substrate 10 in the longitudinal direction. Specifically, the pin portion 62 of one of the spring pins 6 is in contact with the first terminal 11a of the first wire 11 of the substrate 10 in a separable manner. The pin portion 62 of the other of the spring pins 6 is in contact with the first terminal 12a of the second wire 12 of the substrate 10 in a separable manner. In this manner, the thermistor 20 is electrically connected with the wire of the circuit board 3 through the wires 11 and 12 of the substrate 10 and the spring pins 6.

The following describes operation of the temperature detecting device 4.

As illustrated in FIG. 1, when the heat generating component 7 generates heat, the housing 2 is heated by the heat generated by the heat generating component 7. Since the substrate 10 is fixed to the housing 2 by the bonding member 8, the thermistor 20 detects the temperature of the housing 2 through the substrate 10. The controller cools the housing 2 and the heat generating component 7 by operating, for example, a fan based on a result of the detection (current change) by the thermistor 20.

In the temperature detecting device 4, the temperature detector 5 is configured to detect the temperature of the housing 2 while in contact with the housing 2, and the spring pins 6 are in contact with the temperature detector 5 in a separable manner. Thus, at mounting of the temperature detecting device 4 on the electronic device 1, it is possible to fix the temperature detector 5 to the housing 2, and the spring pins 6 to the circuit board 3 of the electronic device 1.

At disassembly of the electronic device 1 for component replacement, repair, or the like, it is easy to separate the spring pins 6 from the temperature detector 5 by removing, from the housing 2, the spring pins 6 together with the circuit board 3 because the spring pins 6 are in contact with the temperature detector 5 in a separable manner. Then, at assembly of the electronic device 1 again, it is easy to make the spring pins 6 contact with the temperature detector 5 by attaching, to the housing 2, the spring pins 6 together with the circuit board 3. Since the temperature detector 5 is fixed to the housing 2, the position of the thermistor 20 is able to be maintained with respect to the housing 2 during the assembly, which eliminates the need to adjust the position of the thermistor 20. Accordingly, favorable convenience is able to be achieved in assembling when the temperature detecting device 4 is used in the electronic device 1.

The electronic device 1 includes the temperature detecting device 4, and thus provides favorable convenience in assembling.

The present invention is not limited to the above-described preferred embodiments, but may be modified in design without departing from the scope of the present invention. The number of spring pins may be changed.

In the preferred embodiments of the present invention, the thermistor preferably is disposed at the central portion of the substrate in the longitudinal direction, and the spring pins support both ends of the substrate in the longitudinal direction, for example. However, the thermistor may be disposed at one end of the substrate in the longitudinal direction, and a spring pin may support the other end of the substrate in the longitudinal direction.

In the preferred embodiments of the present invention, the thermistor preferably is an NTC thermistor, but may be a PTC thermistor the electric resistance of which abruptly increases at the Curie temperature.

In the preferred embodiments of the present invention, the surface of the base material, which is opposite to the thermistor, preferably is in contact with the housing, but the thermistor may be in contact with the housing.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A temperature detecting device configured to detect a temperature of a housing of an electronic device, the temperature detecting device comprising:

a temperature detector that detects the temperature of the housing while in contact with the housing of the electronic device;

a spring pin electrically connected with the temperature detector while in contact with the temperature detector in a separable manner; wherein the temperature detecting device is to be disposed inside of the housing of the electronic device;

the temperature detector includes a substrate including a wire, and a thermistor attached to the substrate and electrically connected with the wire;

the spring pin includes a tube body, a pin portion attached in the tube body in a movable manner, and a spring that presses the pin portion to protrude out of the tube body; and the pin portion is electrically connected with the wire of the substrate while in contact with the wire of the substrate in a separable manner.

2. The temperature detecting device according to claim 1, further comprising an additional spring pin.

3. The temperature detecting device according to claim 2, wherein the spring pin and the additional spring pin elastically press the temperature detector to cause the temperature detector to contact with the housing elastically.

4. The temperature detecting device according to claim 1, wherein the substrate includes a base material, the wire and an additional wire, and two covers that cover a portion of the wire and the additional wire.

5. The temperature detecting device according to claim 1, wherein the thermistor is a multilayer chip thermistor.

6. The temperature detecting device according to claim 1, wherein the thermistor includes a thermistor body, a first external electrode, and a second external electrode.

7. The temperature detecting device according to claim 6, wherein the thermistor body includes a plurality of ceramic layers laminated on top of another and an internal electrode between adjacent ones of the plurality of ceramic layers.

8. The temperature detecting device according to claim 1, wherein the thermistor is an NTC thermistor and has a resistance value that decreases as the temperature increases.

9. The temperature detecting device according to claim 1, wherein the spring pin is a pogo pin.

10. The temperature detecting device according to claim 1, wherein the substrate includes a base material, and the temperature detecting device further comprises a bonding member that attaches a surface of the base material, which is opposite to the thermistor, to the housing.

11. The temperature detecting device according to claim 10, wherein the bonding member is a double-sided adhesive tape and is thermally conductive.

12. The temperature detecting device according to claim 10, wherein the bonding member overlaps with the thermistor when viewed in a direction orthogonal to the base material.

13. An electronic device comprising:
a housing;
a circuit board disposed in the housing; and
a temperature detecting device disposed in the housing to detect the temperature of the housing; wherein
the temperature detecting device includes:
a temperature detector that detects the temperature of the housing while in contact with the housing; and
a spring pin electrically connected with the temperature detector while in contact with the temperature detector in a separable manner;
the temperature detector includes a substrate including a wire, and a thermistor attached to the substrate and electrically connected with the wire;
the spring pin includes a tube body, a pin portion attached in the tube body in a movable manner, and a spring that presses the pin portion to protrude out of the tube body; and
the pin portion is electrically connected with the wire of the substrate while in contact with the wire of the substrate in a separable manner.

14. The electronic device according to claim 13, wherein the temperature detector of the temperature detecting device is fixed to the housing; and
the spring pin of the temperature detecting device is fixed to the circuit board.

15. The electronic device according to claim 13, wherein the electronic device is one of a phone and a computer.

16. The electronic device according to claim 13, wherein the housing has a rectangular parallelepiped or substantially rectangular parallelepiped shape.

17. The electronic device according to claim 13, further comprising a liquid crystal display attached to the housing.

18. The electronic device according to claim 13, further comprising a heat-generating electric component mounted on the circuit board.

19. The electronic device according to claim 18, wherein the heat-generating electric component is one of a CPU and a power amplifier.

20. The electronic device according to claim 13, further comprising:
a heat-generating electric component; and
a controller that cools the housing and the heat-generating component by operating a fan based on a result of the detection by the temperature detecting device.

* * * * *